(12) United States Patent
Held

(10) Patent No.: US 9,014,791 B2
(45) Date of Patent: Apr. 21, 2015

(54) SYSTEM AND METHOD FOR MANAGING THERMAL ISSUES IN GAS TURBINE ENGINES

(75) Inventor: Timothy James Held, Akron, OH (US)

(73) Assignee: Echogen Power Systems, LLC, Akron, OH (US)

( * ) Notice: Subject to any disclaimer, the term of this patent is extended or adjusted under 35 U.S.C. 154(b) by 831 days.

(21) Appl. No.: 13/264,743

(22) PCT Filed: Apr. 19, 2010

(86) PCT No.: PCT/US2010/031614
§ 371 (c)(1),
(2), (4) Date: Nov. 11, 2011

(87) PCT Pub. No.: WO2010/121255
PCT Pub. Date: Oct. 21, 2010

(65) Prior Publication Data
US 2012/0067055 A1    Mar. 22, 2012

Related U.S. Application Data

(60) Provisional application No. 61/170,364, filed on Apr. 17, 2009.

(51) Int. Cl.
*F02C 7/08* (2006.01)
*F02C 7/06* (2006.01)
(Continued)

(52) U.S. Cl.
CPC . *F02K 3/115* (2013.01); *F02C 7/14* (2013.01); *F02C 7/224* (2013.01); *F02C 7/12* (2013.01);
(Continued)

(58) Field of Classification Search
CPC .............. F02C 7/14; F02C 7/224; F02C 7/12; F02C 6/18; F02C 1/06; F02C 3/34; F02K 3/115

USPC .................. 60/39.181, 39.182, 782, 785, 783
See application file for complete search history.

(56) References Cited

U.S. PATENT DOCUMENTS 2,575,478 A    11/1951  Wilson
2,634,375 A     4/1953  Guimbal
(Continued)

FOREIGN PATENT DOCUMENTS

CA    2794150 A1   11/2011
CN    1165238 A    11/1997
(Continued)

OTHER PUBLICATIONS

PCT/US2010/031614—International Preliminary Report on Patentability dated Oct. 27, 2011.
(Continued)

*Primary Examiner* — William H Rodriguez
(74) *Attorney, Agent, or Firm* — Edmonds & Nolte, PC

(57) ABSTRACT

The present invention generally relates to a system that enables one to address various thermal management issues in advanced gas turbine engines. In one embodiment, the present invention relates to a method to extract heat from an air stream, utilize a significant fraction for on-board power generation, and reject a small quantity of heat to the fuel stream safely at, for example, a lower temperature. In another embodiment, the present invention relates to a method to extract heat from an air stream, utilize a significant fraction for on-board power generation, and reject a small quantity of heat to the fuel stream safely at, for example, a lower temperature with no potential air/fuel contact is disclosed.

37 Claims, 3 Drawing Sheets

(51) Int. Cl.
| | |
|---|---|
| *F02K 3/115* | (2006.01) |
| *F02C 7/12* | (2006.01) |
| *F02C 7/16* | (2006.01) |
| *F02C 1/06* | (2006.01) |
| *F02C 3/34* | (2006.01) |
| *F02C 6/18* | (2006.01) |
| *F02C 7/14* | (2006.01) |
| *F02C 7/224* | (2006.01) |

(52) U.S. Cl.
CPC .............. *F02C 7/16* (2013.01); *Y02T 50/671* (2013.01); *Y02T 50/675* (2013.01); *F02C 1/06* (2013.01); *F02C 3/34* (2013.01); *F02C 6/18* (2013.01)

(56) References Cited

U.S. PATENT DOCUMENTS

| | | | |
|---|---|---|---|
| 2,691,280 A | 10/1954 | Albert | |
| 3,095,274 A | 6/1963 | Crawford | |
| 3,105,748 A | 10/1963 | Stahl | |
| 3,237,403 A | 3/1966 | Feher | |
| 3,277,955 A | 10/1966 | Heller | |
| 3,401,277 A | 9/1968 | Larson | |
| 3,622,767 A | 11/1971 | Koepcke | |
| 3,630,022 A | 12/1971 | Jubb | |
| 3,736,745 A | 6/1973 | Karig | |
| 3,772,879 A | 11/1973 | Engdahl | |
| 3,791,137 A | 2/1974 | Jubb et al. | |
| 3,830,062 A | 8/1974 | Morgan et al. | |
| 3,939,328 A | 2/1976 | Davis | |
| 3,971,211 A | 7/1976 | Wethe | |
| 3,982,379 A | 9/1976 | Gilli | |
| 3,998,058 A | 12/1976 | Park | |
| 4,009,575 A | 3/1977 | Hartman, Jr. | |
| 4,029,255 A | 6/1977 | Heiser | |
| 4,030,312 A | 6/1977 | Wallin | |
| 4,049,407 A | 9/1977 | Bottum | |
| 4,070,870 A | 1/1978 | Bahel | |
| 4,099,381 A | 7/1978 | Rappoport | |
| 4,119,140 A | 10/1978 | Cates | |
| 4,150,547 A | 4/1979 | Hobson | |
| 4,152,901 A | 5/1979 | Munters | |
| 4,164,848 A | 8/1979 | Gilli | |
| 4,164,849 A | 8/1979 | Mangus | |
| 4,170,435 A | 10/1979 | Swearingen | |
| 4,182,960 A | 1/1980 | Reuyl | |
| 4,183,220 A | 1/1980 | Shaw | |
| 4,198,827 A | 4/1980 | Terry et al. | |
| 4,208,882 A | 6/1980 | Lopes | |
| 4,221,185 A | 9/1980 | Scholes | |
| 4,233,085 A | 11/1980 | Roderick | |
| 4,236,869 A | 12/1980 | Laurello | |
| 4,248,049 A | 2/1981 | Briley | |
| 4,257,232 A | 3/1981 | Bell | |
| 4,287,430 A | 9/1981 | Guido | |
| 4,336,692 A | 6/1982 | Ecker | |
| 4,347,711 A | 9/1982 | Noe | |
| 4,347,714 A | 9/1982 | Kinsell | |
| 4,372,125 A | 2/1983 | Dickenson | |
| 4,384,568 A | 5/1983 | Palmatier | |
| 4,391,101 A | 7/1983 | Labbe | |
| 4,420,947 A | 12/1983 | Yoshino | |
| 4,428,190 A | 1/1984 | Bronicki | |
| 4,433,554 A | 2/1984 | Rojey | |
| 4,439,687 A | 3/1984 | Wood | |
| 4,439,994 A | 4/1984 | Briley | |
| 4,448,033 A | 5/1984 | Briccetti | |
| 4,450,363 A | 5/1984 | Russell | |
| 4,455,836 A | 6/1984 | Binstock | |
| 4,467,609 A | 8/1984 | Loomis | |
| 4,467,621 A | 8/1984 | O'Brien | |
| 4,475,353 A | 10/1984 | Lazare | |
| 4,489,562 A | 12/1984 | Snyder | |
| 4,489,563 A | 12/1984 | Kalina | |
| 4,498,289 A | 2/1985 | Osgerby | |
| 4,516,403 A | 5/1985 | Tanaka | |
| 4,538,960 A | 9/1985 | Iino et al. | |
| 4,549,401 A | 10/1985 | Spliethoff | |
| 4,555,905 A | 12/1985 | Endou | |
| 4,558,228 A | 12/1985 | Larjola | |
| 4,573,321 A | 3/1986 | Knaebel | |
| 4,578,953 A | 4/1986 | Krieger | |
| 4,589,255 A | 5/1986 | Martens | |
| 4,636,578 A | 1/1987 | Feinberg | |
| 4,674,297 A | 6/1987 | Vobach | |
| 4,694,189 A | 9/1987 | Haraguchi | |
| 4,697,981 A | 10/1987 | Brown et al. | |
| 4,700,543 A | 10/1987 | Krieger | |
| 4,730,977 A | 3/1988 | Haaser | |
| 4,756,162 A | 7/1988 | Dayan | |
| 4,765,143 A | 8/1988 | Crawford | |
| 4,773,212 A | 9/1988 | Griffin et al. | |
| 4,798,056 A | 1/1989 | Franklin | |
| 4,813,242 A | 3/1989 | Wicks | |
| 4,821,514 A | 4/1989 | Schmidt | |
| 4,867,633 A | 9/1989 | Gravelle | |
| 4,892,459 A | 1/1990 | Guelich | |
| 4,986,071 A | 1/1991 | Voss | |
| 4,993,483 A | 2/1991 | Harris | |
| 5,000,003 A | 3/1991 | Wicks | |
| 5,050,375 A | 9/1991 | Dickinson | |
| 5,083,425 A | 1/1992 | Hendriks et al. | |
| 5,098,194 A | 3/1992 | Kuo | |
| 5,102,295 A | 4/1992 | Pope | |
| 5,104,284 A | 4/1992 | Hustak, Jr. | |
| 5,164,020 A | 11/1992 | Wagner | |
| 5,176,321 A | 1/1993 | Doherty | |
| 5,203,159 A | 4/1993 | Koizumi | |
| 5,228,310 A | 7/1993 | Vandenberg | |
| 5,291,960 A | 3/1994 | Brandenburg | |
| 5,320,482 A | 6/1994 | Palmer et al. | |
| 5,335,510 A | 8/1994 | Rockenfeller | |
| 5,358,378 A | 10/1994 | Holscher | |
| 5,360,057 A | 11/1994 | Rockenfeller | |
| 5,392,606 A | 2/1995 | Labinov | |
| 5,440,882 A | 8/1995 | Kalina | |
| 5,444,972 A | 8/1995 | Moore | |
| 5,488,828 A | 2/1996 | Brossard | |
| 5,490,386 A | 2/1996 | Keller | |
| 5,503,222 A | 4/1996 | Dunne | |
| 5,531,073 A | 7/1996 | Bronicki | |
| 5,538,564 A | 7/1996 | Kaschmitter | |
| 5,542,203 A | 8/1996 | Luoma | |
| 5,570,578 A | 11/1996 | Saujet | |
| 5,588,298 A | 12/1996 | Kalina | |
| 5,600,967 A | 2/1997 | Meckler | |
| 5,634,340 A | 6/1997 | Grennan | |
| 5,647,221 A | 7/1997 | Garris, Jr. | |
| 5,649,426 A | 7/1997 | Kalina | |
| 5,676,382 A | 10/1997 | Dahlheimer | |
| 5,680,753 A | 10/1997 | Hollinger | |
| 5,704,206 A * | 1/1998 | Kaneko et al. | ............... 60/39.12 |
| 5,738,164 A | 4/1998 | Hildebrand | |
| 5,754,613 A | 5/1998 | Hashiguchi | |
| 5,771,700 A | 6/1998 | Cochran | |
| 5,782,081 A * | 7/1998 | Pak et al. | ................... 60/39.181 |
| 5,789,822 A | 8/1998 | Calistrat | |
| 5,813,215 A | 9/1998 | Weisser | |
| 5,833,876 A | 11/1998 | Schnur | |
| 5,862,666 A | 1/1999 | Liu | |
| 5,873,260 A | 2/1999 | Linhardt | |
| 5,874,039 A | 2/1999 | Edelson | |
| 5,894,836 A | 4/1999 | Wu | |
| 5,899,067 A | 5/1999 | Hageman | |
| 5,903,060 A | 5/1999 | Norton | |
| 5,918,460 A | 7/1999 | Connell | |
| 5,941,238 A | 8/1999 | Tracy | |
| 5,943,869 A | 8/1999 | Cheng | |
| 5,946,931 A | 9/1999 | Lomax | |
| 5,973,050 A | 10/1999 | Johnson | |
| 6,037,683 A | 3/2000 | Lulay | |
| 6,041,604 A | 3/2000 | Nicodemus | |
| 6,058,930 A | 5/2000 | Shingleton | |

(56) References Cited

U.S. PATENT DOCUMENTS

| | | |
|---|---|---|
| 6,062,815 A | 5/2000 | Holt |
| 6,065,280 A | 5/2000 | Ranasinghe |
| 6,066,797 A | 5/2000 | Toyomura |
| 6,070,405 A | 6/2000 | Jerye |
| 6,082,110 A | 7/2000 | Rosenblatt |
| 6,105,368 A | 8/2000 | Hansen |
| 6,112,547 A | 9/2000 | Spauschus |
| 6,129,507 A | 10/2000 | Ganelin |
| 6,158,237 A | 12/2000 | Riffat |
| 6,164,655 A | 12/2000 | Bothien |
| 6,202,782 B1 | 3/2001 | Hatanaka |
| 6,223,846 B1 | 5/2001 | Schechter |
| 6,233,938 B1 | 5/2001 | Nicodemus |
| 6,282,900 B1 | 9/2001 | Bell |
| 6,282,917 B1 | 9/2001 | Mongan |
| 6,295,818 B1 | 10/2001 | Ansley |
| 6,299,690 B1 | 10/2001 | Mongeon |
| 6,341,781 B1 | 1/2002 | Matz |
| 6,374,630 B1 | 4/2002 | Jones |
| 6,393,851 B1 | 5/2002 | Wightman |
| 6,432,320 B1 | 8/2002 | Bonsignore |
| 6,434,955 B1 | 8/2002 | Ng |
| 6,442,951 B1 | 9/2002 | Maeda |
| 6,446,425 B1 | 9/2002 | Lawlor |
| 6,446,465 B1 | 9/2002 | Dubar |
| 6,463,730 B1 | 10/2002 | Keller |
| 6,484,490 B1 | 11/2002 | Olsen |
| 6,539,720 B2 | 4/2003 | Rouse et al. |
| 6,539,728 B2 | 4/2003 | Korin |
| 6,571,548 B1 | 6/2003 | Bronicki |
| 6,581,384 B1 | 6/2003 | Benson |
| 6,598,397 B2 | 7/2003 | Hanna |
| 6,644,062 B1 | 11/2003 | Hays |
| 6,657,849 B1 | 12/2003 | Andresakis |
| 6,668,554 B1 | 12/2003 | Brown |
| 6,684,625 B2 | 2/2004 | Kline |
| 6,695,974 B2 | 2/2004 | Withers |
| 6,715,294 B2 | 4/2004 | Anderson |
| 6,734,585 B2 | 5/2004 | Tornquist |
| 6,735,948 B1 | 5/2004 | Kalina |
| 6,739,142 B2 | 5/2004 | Korin |
| 6,751,959 B1 | 6/2004 | McClanahan |
| 6,769,256 B1 | 8/2004 | Kalina |
| 6,799,892 B2 | 10/2004 | Leuthold |
| 6,808,179 B1 | 10/2004 | Bhattacharyya |
| 6,810,335 B2 | 10/2004 | Lysaght |
| 6,817,185 B2 | 11/2004 | Coney |
| 6,857,268 B2 | 2/2005 | Stinger |
| 6,910,334 B2 | 6/2005 | Kalina |
| 6,918,254 B2 | 7/2005 | Baker |
| 6,921,518 B2 | 7/2005 | Johnston |
| 6,941,757 B2 | 9/2005 | Kalina |
| 6,960,839 B2 | 11/2005 | Zimron |
| 6,960,840 B2 | 11/2005 | Willis |
| 6,962,054 B1 | 11/2005 | Linney |
| 6,964,168 B1 | 11/2005 | Pierson |
| 6,968,690 B2 | 11/2005 | Kalina |
| 6,986,251 B2 | 1/2006 | Radcliff |
| 7,013,205 B1 | 3/2006 | Hafner et al. |
| 7,021,060 B1 | 4/2006 | Kalina |
| 7,022,294 B2 | 4/2006 | Johnston |
| 7,033,533 B2 | 4/2006 | Lewis-Aburn et al. |
| 7,036,315 B2 | 5/2006 | Kang |
| 7,041,272 B2 | 5/2006 | Keefer |
| 7,047,744 B1 | 5/2006 | Robertson |
| 7,048,782 B1 | 5/2006 | Couch |
| 7,062,913 B2 | 6/2006 | Christensen |
| 7,096,665 B2 | 8/2006 | Stinger |
| 7,096,679 B2 | 8/2006 | Manole |
| 7,124,587 B1 | 10/2006 | Linney |
| 7,174,715 B2 | 2/2007 | Armitage |
| 7,194,863 B2 | 3/2007 | Ganev |
| 7,197,876 B1 | 4/2007 | Kalina |
| 7,200,996 B2 | 4/2007 | Cogswell |
| 7,234,314 B1 | 6/2007 | Wiggs |
| 7,249,588 B2 | 7/2007 | Russell |
| 7,278,267 B2 | 10/2007 | Yamada |
| 7,279,800 B2 | 10/2007 | Bassett |
| 7,287,381 B1 | 10/2007 | Pierson |
| 7,305,829 B2 | 12/2007 | Mirolli |
| 7,313,926 B2 | 1/2008 | Gurin |
| 7,340,894 B2 | 3/2008 | Miyahara |
| 7,340,897 B2 | 3/2008 | Zimron |
| 7,406,830 B2 | 8/2008 | Valentian |
| 7,416,137 B2 | 8/2008 | Hagen et al. |
| 7,453,242 B2 | 11/2008 | Ichinose |
| 7,458,217 B2 | 12/2008 | Kalina |
| 7,458,218 B2 | 12/2008 | Kalina |
| 7,464,551 B2 | 12/2008 | Althaus et al. |
| 7,469,542 B2 | 12/2008 | Kalina |
| 7,516,619 B2 | 4/2009 | Pelletier |
| 7,600,394 B2 | 10/2009 | Kalina |
| 7,621,133 B2 | 11/2009 | Tomlinson |
| 7,654,354 B1 | 2/2010 | Otterstrom |
| 7,665,291 B2 | 2/2010 | Anand |
| 7,665,304 B2 | 2/2010 | Sundel |
| 7,685,821 B2 | 3/2010 | Kalina |
| 7,730,713 B2 | 6/2010 | Nakano |
| 7,735,335 B2 | 6/2010 | Uno |
| 7,770,376 B1 | 8/2010 | Brostmeyer |
| 7,775,758 B2 | 8/2010 | Legare |
| 7,827,791 B2 | 11/2010 | Pierson |
| 7,838,470 B2 | 11/2010 | Shaw |
| 7,841,179 B2 | 11/2010 | Kalina |
| 7,841,306 B2 | 11/2010 | Myers |
| 7,854,587 B2 | 12/2010 | Ito |
| 7,866,157 B2 | 1/2011 | Ernst |
| 7,900,450 B2 | 3/2011 | Gurin |
| 7,950,230 B2 | 5/2011 | Nishikawa |
| 7,950,243 B2 | 5/2011 | Gurin |
| 7,971,424 B2 * | 7/2011 | Masada ............... 60/39.182 |
| 7,972,529 B2 | 7/2011 | Machado |
| 7,997,076 B2 | 8/2011 | Ernst |
| 8,096,128 B2 | 1/2012 | Held et al. |
| 8,099,198 B2 | 1/2012 | Gurin |
| 8,146,360 B2 | 4/2012 | Myers |
| 8,281,593 B2 | 10/2012 | Held |
| 8,419,936 B2 | 4/2013 | Berger et al. |
| 2001/0015061 A1 | 8/2001 | Viteri et al. |
| 2001/0020444 A1 | 9/2001 | Johnston |
| 2001/0030952 A1 | 10/2001 | Roy |
| 2002/0029558 A1 | 3/2002 | Tamaro |
| 2002/0066270 A1 | 6/2002 | Rouse et al. |
| 2002/0078696 A1 | 6/2002 | Korin |
| 2002/0078697 A1 | 6/2002 | Lifson |
| 2002/0082747 A1 | 6/2002 | Kramer |
| 2003/0000213 A1 | 1/2003 | Christensen |
| 2003/0061823 A1 | 4/2003 | Alden |
| 2003/0154718 A1 | 8/2003 | Nayar |
| 2003/0182946 A1 | 10/2003 | Sami |
| 2003/0213246 A1 | 11/2003 | Coll et al. |
| 2003/0221438 A1 | 12/2003 | Rane et al. |
| 2004/0011038 A1 | 1/2004 | Stinger |
| 2004/0011039 A1 | 1/2004 | Stinger et al. |
| 2004/0020185 A1 | 2/2004 | Brouillette et al. |
| 2004/0020206 A1 | 2/2004 | Sullivan et al. |
| 2004/0021182 A1 | 2/2004 | Green et al. |
| 2004/0035117 A1 | 2/2004 | Rosen |
| 2004/0083731 A1 | 5/2004 | Lasker |
| 2004/0083732 A1 | 5/2004 | Hanna et al. |
| 2004/0088992 A1 | 5/2004 | Brasz et al. |
| 2004/0097388 A1 | 5/2004 | Brask et al. |
| 2004/0105980 A1 | 6/2004 | Sudarshan et al. |
| 2004/0107700 A1 | 6/2004 | McClanahan et al. |
| 2004/0159110 A1 | 8/2004 | Janssen |
| 2004/0211182 A1 | 10/2004 | Gould |
| 2005/0022963 A1 | 2/2005 | Garrabrant et al. |
| 2005/0056001 A1 | 3/2005 | Frutschi |
| 2005/0096676 A1 | 5/2005 | Gifford, III et al. |
| 2005/0109387 A1 | 5/2005 | Marshall |
| 2005/0137777 A1 | 6/2005 | Kolavennu et al. |
| 2005/0162018 A1 | 7/2005 | Realmuto et al. |
| 2005/0167169 A1 | 8/2005 | Gering et al. |
| 2005/0183421 A1 | 8/2005 | Vaynberg et al. |

(56) References Cited

U.S. PATENT DOCUMENTS

| | | |
|---|---|---|
| 2005/0196676 A1 | 9/2005 | Singh et al. |
| 2005/0198959 A1 | 9/2005 | Schubert |
| 2005/0227187 A1 | 10/2005 | Schilling |
| 2005/0252235 A1 | 11/2005 | Critoph et al. |
| 2005/0257812 A1 | 11/2005 | Wright et al. |
| 2006/0010868 A1 | 1/2006 | Smith |
| 2006/0060333 A1 | 3/2006 | Chordia et al. |
| 2006/0066113 A1 | 3/2006 | Ebrahim et al. |
| 2006/0080960 A1 | 4/2006 | Rajendran et al. |
| 2006/0112693 A1 | 6/2006 | Sundel |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0225421 A1 | 10/2006 | Yamanaka et al. |
| 2006/0225459 A1 | 10/2006 | Meyer |
| 2006/0249020 A1 | 11/2006 | Tonkovich et al. |
| 2006/0254281 A1 | 11/2006 | Badeer et al. |
| 2007/0001766 A1 | 1/2007 | Ripley et al. |
| 2007/0017192 A1 | 1/2007 | Bednarek et al. |
| 2007/0019708 A1 | 1/2007 | Shiflett et al. |
| 2007/0027038 A1 | 2/2007 | Kamimura et al. |
| 2007/0056290 A1 | 3/2007 | Dahm |
| 2007/0089449 A1 | 4/2007 | Gurin |
| 2007/0108200 A1 | 5/2007 | McKinzie, II |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0227472 A1 | 10/2007 | Takeuchi et al. |
| 2007/0234722 A1 | 10/2007 | Kalina |
| 2007/0245733 A1 | 10/2007 | Pierson et al. |
| 2007/0246206 A1 | 10/2007 | Gong et al. |
| 2008/0000225 A1 | 1/2008 | Kalina |
| 2008/0006040 A1 | 1/2008 | Peterson et al. |
| 2008/0010967 A1 | 1/2008 | Griffin |
| 2008/0023666 A1 | 1/2008 | Gurin |
| 2008/0053095 A1 | 3/2008 | Kalina |
| 2008/0066470 A1 | 3/2008 | MacKnight |
| 2008/0135253 A1 | 6/2008 | Vinegar et al. |
| 2008/0163625 A1 | 7/2008 | O'Brien |
| 2008/0173450 A1 | 7/2008 | Goldberg et al. |
| 2008/0211230 A1 | 9/2008 | Gurin |
| 2008/0250789 A1 | 10/2008 | Myers et al. |
| 2008/0252078 A1 | 10/2008 | Myers |
| 2009/0021251 A1 | 1/2009 | Simon |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 | 6/2009 | Straubel |
| 2009/0173337 A1 | 7/2009 | Tamaura et al. |
| 2009/0173486 A1 | 7/2009 | Copeland |
| 2009/0180903 A1 | 7/2009 | Martin et al. |
| 2009/0205892 A1 | 8/2009 | Jensen et al. |
| 2009/0211251 A1 | 8/2009 | Petersen et al. |
| 2009/0211253 A1 | 8/2009 | Radcliff et al. |
| 2009/0266075 A1 | 10/2009 | Westmeier et al. |
| 2009/0293503 A1 | 12/2009 | Vandor |
| 2010/0024421 A1 | 2/2010 | Litwin |
| 2010/0077792 A1 | 4/2010 | Gurin |
| 2010/0083662 A1 | 4/2010 | Kalina |
| 2010/0102008 A1 | 4/2010 | Hedberg |
| 2010/0122533 A1 | 5/2010 | Kalina |
| 2010/0146949 A1 | 6/2010 | Stobart et al. |
| 2010/0146973 A1 | 6/2010 | Kalina |
| 2010/0156112 A1 | 6/2010 | Held et al. |
| 2010/0162721 A1 | 7/2010 | Welch et al. |
| 2010/0205962 A1 | 8/2010 | Kalina |
| 2010/0218513 A1 | 9/2010 | Vaisman et al. |
| 2010/0218930 A1 | 9/2010 | Proeschel |
| 2010/0263380 A1 | 10/2010 | Biederman et al. |
| 2010/0287934 A1 | 11/2010 | Glynn et al. |
| 2010/0300093 A1 | 12/2010 | Doty |
| 2010/0326076 A1 | 12/2010 | Ast et al. |
| 2011/0027064 A1 | 2/2011 | Pal et al. |
| 2011/0030404 A1 | 2/2011 | Gurin |
| 2011/0048012 A1 | 3/2011 | Ernst et al. |
| 2011/0061384 A1 | 3/2011 | Held et al. |
| 2011/0061387 A1 | 3/2011 | Held et al. |
| 2011/0088399 A1 | 4/2011 | Briesch et al. |
| 2011/0179799 A1 | 7/2011 | Allam |
| 2011/0185729 A1 | 8/2011 | Held |
| 2011/0192163 A1 | 8/2011 | Kasuya |
| 2011/0203278 A1 | 8/2011 | Kopecek et al. |
| 2011/0259010 A1 | 10/2011 | Bronicki et al. |
| 2011/0299972 A1 | 12/2011 | Morris |
| 2011/0308253 A1 | 12/2011 | Ritter |
| 2012/0047892 A1 | 3/2012 | Held et al. |
| 2012/0067055 A1 | 3/2012 | Held |
| 2012/0128463 A1 | 5/2012 | Held |
| 2012/0131918 A1 | 5/2012 | Held |
| 2012/0131919 A1 | 5/2012 | Held |
| 2012/0131920 A1 | 5/2012 | Held |
| 2012/0131921 A1 | 5/2012 | Held |
| 2012/0159922 A1 | 6/2012 | Gurin |
| 2012/0159956 A1 | 6/2012 | Gurin |
| 2012/0174558 A1 | 7/2012 | Gurin |
| 2012/0186219 A1 | 7/2012 | Gurin |
| 2012/0247134 A1 | 10/2012 | Gurin |
| 2012/0247455 A1 | 10/2012 | Gurin et al. |
| 2012/0261090 A1 | 10/2012 | Durmaz et al. |
| 2013/0019597 A1 | 1/2013 | Kalina |
| 2013/0033037 A1 | 2/2013 | Held et al. |
| 2013/0036736 A1 | 2/2013 | Hart et al. |
| 2013/0113221 A1 | 5/2013 | Held |

FOREIGN PATENT DOCUMENTS

| | | |
|---|---|---|
| CN | 1432102 A | 7/2003 |
| CN | 101614139 A | 12/2009 |
| CN | 202055876 U | 11/2011 |
| CN | 202544943 U | 11/2012 |
| CN | 202718721 U | 2/2013 |
| DE | 2632777 A1 | 2/1977 |
| DE | 19906087 A1 | 8/2000 |
| DE | 10052993 A1 | 5/2002 |
| EP | 1977174 A2 | 10/2008 |
| EP | 1998013 A2 | 12/2008 |
| EP | 2419621 A1 | 2/2012 |
| EP | 2446122 A1 | 5/2012 |
| EP | 2478201 A1 | 7/2012 |
| EP | 2500530 A1 | 9/2012 |
| EP | 2550436 | 1/2013 |
| GB | 856985 A1 | 12/1960 |
| GB | 2010974 A | 7/1979 |
| GB | 2075608 A | 11/1981 |
| JP | 58-193051 A | 11/1983 |
| JP | 60040707 A | 3/1985 |
| JP | 61-152914 A | 7/1986 |
| JP | 01-240705 A | 9/1989 |
| JP | 05-321612 A | 12/1993 |
| JP | 06-331225 A | 11/1994 |
| JP | 08028805 A | 2/1996 |
| JP | 09-100702 A | 4/1997 |
| JP | 2641581 B2 | 5/1997 |
| JP | 09-209716 A | 8/1997 |
| JP | 2858750 B2 | 12/1998 |
| JP | H11270352 | 5/1999 |
| JP | 2000257407 A | 9/2000 |
| JP | 2001-193419 A | 7/2001 |
| JP | 2002-097965 A | 4/2002 |
| JP | 2003529715 | 10/2003 |
| JP | 2004-239250 A | 8/2004 |
| JP | 2004-332626 A | 11/2004 |
| JP | 2005030727 A | 2/2005 |
| JP | 2005-533972 | 11/2005 |
| JP | 2005-533972 A1 | 11/2005 |
| JP | 2006037760 A | 2/2006 |
| JP | 2006177266 A | 7/2006 |
| JP | 2007-198200 | 8/2007 |
| JP | 2007-198200 A | 9/2007 |
| JP | 4343738 B2 | 10/2009 |

(56) References Cited

FOREIGN PATENT DOCUMENTS

| | | |
|---|---|---|
| JP | 2011-017268 A | 1/2011 |
| KR | 10-0191080 B1 | 6/1999 |
| KR | 100191080 | 6/1999 |
| KR | 10-2007-0086244 A | 8/2007 |
| KR | 10-0766101 B1 | 10/2007 |
| KR | 10-0844634 A | 7/2008 |
| KR | 10-0844634 B1 | 7/2008 |
| KR | 10-20100067927 A | 6/2010 |
| KR | 1020110018769 A | 2/2011 |
| KR | 1069914 B1 | 9/2011 |
| KR | 1103549 B1 | 1/2012 |
| KR | 10-2012-0058582 A | 6/2012 |
| KR | 2012-0068670 A | 6/2012 |
| KR | 2012-0128753 A | 11/2012 |
| KR | 2012-0128755 A | 11/2012 |
| WO | WO 91/05145 A1 | 4/1991 |
| WO | WO 96/09500 A1 | 3/1996 |
| WO | 0071944 A1 | 11/2000 |
| WO | WO 01/44658 A1 | 6/2001 |
| WO | WO 2006/060253 | 6/2006 |
| WO | WO 2006/137957 A1 | 12/2006 |
| WO | WO 2007/056241 A2 | 5/2007 |
| WO | WO 2007/079245 A2 | 7/2007 |
| WO | WO 2007/082103 A2 | 7/2007 |
| WO | WO 2007/112090 A2 | 10/2007 |
| WO | WO 2008/039725 A2 | 4/2008 |
| WO | 2008101711 A2 | 8/2008 |
| WO | 2009-045196 A1 | 4/2009 |
| WO | WO 2009/058992 A2 | 5/2009 |
| WO | 2010-074173 A1 | 7/2010 |
| WO | 2010083198 A1 | 7/2010 |
| WO | 2010121255 A1 | 10/2010 |
| WO | WO 2010/126980 A2 | 11/2010 |
| WO | WO 2010/151560 A1 | 12/2010 |
| WO | WO 2011/017450 A2 | 2/2011 |
| WO | WO 2011/017476 A1 | 2/2011 |
| WO | WO 2011/017599 A1 | 2/2011 |
| WO | WO 2011/034984 A1 | 3/2011 |
| WO | WO 2011/094294 A2 | 8/2011 |
| WO | WO 2011/119650 A2 | 9/2011 |
| WO | 2012-074905 A2 | 6/2012 |
| WO | 2012-074907 A2 | 6/2012 |
| WO | 2012-074911 A2 | 6/2012 |
| WO | WO 2012/074940 A2 | 6/2012 |
| WO | WO 2013/055391 A1 | 4/2013 |
| WO | WO 2013/059687 A1 | 4/2013 |
| WO | WO 2013/059695 A1 | 4/2013 |
| WO | WO 2013/070249 A1 | 5/2013 |
| WO | WO 2013/074907 A1 | 5/2013 |

OTHER PUBLICATIONS

Vaclav Dostal, Martin Kulhanek, "Research on the Supercritical Carbon Dioxide Cycles in the Czech Republic", Department of Fluid Mechanics and Power Engineering Czech Technical University in Prague, RPI, Troy, NY, Apr. 29-30, 2009; 8 pages.

PCT/US2010/031614 Notification of Transmittal of the International Search Report and the Written Opinion of the International Searching Authority, or the Declaration dated Jul. 12, 2012.

Alpy, N., et al., "French Atomic Energy Commission views as regards SCO2 Cycle Development priorities and related R&D approach," Presentation, Symposium on SCO2 Power Cycles, Apr. 29-30, 2009, Troy, NY, 20 pages.

Angelino, G., and Invernizzi, C.M., "Carbon Dioxide Power Cycles using Liquid Natural Gas as Heat Sink", Applied Thermal Engineering Mar. 3, 2009, 43 pages.

Bryant, John C., Saari, Henry, and Zanganeh, Kourosh, "An Analysis and Comparison of the Simple and Recompression Supercritical CO2 Cycles" Supercritical CO2 Power Cycle Symposium, May 24-25, 2011, Boulder, CO, 8 pages.

Chapman, Daniel J., Arias, Diego A., "An Assessment of the Supercritical Carbon Dioxide Cycle for Use in a Solar Parabolic Trough Power Plant", Presentation, Abengoa Solar, Apr. 29-30, 2009, Troy, NY, 20 pages.

Chapman, Daniel J., Arias, Diego A., "An Assessment of the Supercritical Carbon Dioxide Cycle for Use in a Solar Parabolic Trough Power Plant", Paper, Abengoa Solar, Apr. 29-30, 2009, Troy, NY, 5 pages.

Chen, Yang, Lundqvist, P., Johansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.

Chen, Yang, "Thermodynamic Cycles Using Carbon Dioxide as Working Fluid", Doctoral Thesis, School of Industrial Engineering and Management, Stockholm, Oct. 2011, 150 pages., (3 parts).

Chordia, Lalit, "Optimizing Equipment for Supercritical Applications", Thar Energy LLC, Supercritical CO2 Power Cycle Symposium, May 24-25, 2011, Boulder, CO, 7 pages.

Combs, Osie V., "An Investigation of the Supercritical CO2 Cycle (Feher cycle) for Shipboard Application", Massachusetts Institute of Technology, May 1977, 290 pages.

Di Bella, Francis A., "Gas Turbine Engine Exhaust Waste Heat Recovery Navy Shipboard Module Development", Supercritical CO2 Power Cycle Symposium, May 24-25, 2011, Boulder, CO, 8 pages.

Dostal, V., et al., A Supercritical Carbon Dioxide Cycle for Next Generation Nuclear Reactors, Mar. 10, 2004, 326 pages., (7 parts).

Dostal, Vaclav, and Dostal, Jan, "Supercritical CO2 Regeneration Bypass Cycle—Comparison to Traditional Layouts", Supercritical CO2 Power Cycle Symposium, May 24-25, 2011, Boulder, CO, 5 pages.

Eisemann, Kevin, and Fuller, Robert L., "Supercritical CO2 Brayton Cycle Design and System Start-up Options", Barber Nichols, Inc., Paper, Supercritical CO2 Power Cycle Symposium, May 24-25, 2011, Boulder, CO, 7 pages.

Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.

Feher, E.G., et al., "Investigation of Supercritical (Feher) Cycle", Astropower Laboratory, Missile & Space Systems Division, Oct. 1968, 152 pages.

Fuller, Robert L., and Eisemann, Kevin, "Centrifugal Compressor Off-Design Performance for Super-Critical CO2", Barber Nichols, Inc. Presentation, Supercritical CO2 Power Cycle Symposium, May 24-25, 2011, Boulder, CO, 20 pages.

Fuller, Robert L., and Eisemann, Kevin, "Centrifugal Compressor Off-Design Performance for Super-Critical CO2", Paper, Supercritical CO2 Power Cycle Symposium, May 24-25, 2011, Boulder, CO, 12 pages.

Gokhstein, D.P. and Verkhivker, G.P. "Use of Carbon Dioxide as a Heat Carrier and Working Substance in Atomic Power Stations", Soviet Atomic Energy, Apr. 1969, vol. 26, Issue 4, pp. 430-432.

Gokhstein, D.P.; Taubman, E.I.; Konyaeva, G.P., "Thermodynamic Cycles of Carbon Dioxide Plant with an Additional Turbine After the Regenerator", Energy Citations Database, Mar. 1973, 1 Page, Abstract only.

Hejzlar, P. et al., "Assessment of Gas Cooled Gas Reactor with Indirect Supercritical CO2 Cycle" Massachusetts Institute of Technology, Jan. 2006, 10 pages.

Hoffman, John R., and Feher, E.G., "150 kwe Supercritical Closed Cycle System", Transactions of the ASME, Jan. 1971, pp. 70-80.

Jeong, Woo Seok, et al., "Performance of S-CO2 Brayton Cycle with Additive Gases for SFR Application", Korea Advanced Institute of Science and Technology, Supercritical CO2 Power Cycle Symposium, May 24-25, 2011, Boulder, CO, 5 pages.

Johnson, Gregory A., & McDowell, Michael, "Issues Associated with Coupling Supercritical CO2 Power Cycles to Nuclear, Solar and Fossil Fuel Heat Sources", Hamilton Sundstrand, Energy Space & Defense—Rocketdyne, Apr. 29-30, 2009, Troy, NY, Presentation, 18 pages.

Kawakubo, Tomoki, "Unsteady Roto-Stator Interaction of a Radial-Inflow Turbine with Variable Nozzle Vanes", ASME Turbo Expo 2010: Power for Land, Sea, and Air; vol. 7: Turbomachinery, Parts A, B, and C; Glasgow, UK, Jun. 14-18, 2010, Paper No. GT2010-23677, pp. 2075-2084, (1 page, Abstract only).

(56) References Cited

OTHER PUBLICATIONS

Kulhanek, Martin, "Thermodynamic Analysis and Comparison of S-CO2 Cycles", Presentation, Czech Technical University in Prague, Supercritical CO2 Power Cycle Symposium, May 24-25, 2011, Boulder, CO, 14 pages.
Kulhanek, Martin, "Thermodynamic Analysis and Comparison of S-CO2 Cycles", Paper, Czech Technical University in Prague, Supercritical CO2 Power Cycle Symposium, May 24-25, 2011, Boulder, CO, 7 pages.
Kulhanek, Martin., and Dostal, Vaclav, "Supercritical Carbon Dioxide Cycles Thermodynamic Analysis and Comparison", Abstract, Faculty Conference held in Prague, Mar. 24, 2009, 13 pages.
Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.
Moisseytsev, Anton, and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.
Munoz De Escalona, Jose M., "The Potential of the Supercritical Carbon Dioxide Cycle in High Temperature Fuel Cell Hybrid Systems", Paper, Thermal Power Group, University of Seville, Supercritical CO2 Power Cycle Symposium, May 24-25, 2011, Boulder, CO, 6 pages.
Munoz De Escalona, Jose M., et al., "The Potential of the Supercritical Carbon Dioxide Cycle in High Temperature Fuel Cell Hybrid Systems", Presentation, Thermal Power Group, University of Seville, Supercritical CO2 Power Cycle Symposium, May 24-25, 2011, Boulder, CO, 19 pages.
Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.
Muto, Yasushi, and Kato, Yasuyoshi, "Optimal Cycle Scheme of Direct Cycle Supercritical CO2 Gas Turbine for Nuclear Power Generation Systems", International Conference on Power Engineering—2007, Oct. 23-27, 2007, Hangzhou, China, pp. 86-87.
Noriega, Bahamonde J.S., "Design Method for s-CO2 Gas Turbine Power Plants", Master of Science Thesis, Delft University of Technology, Oct. 2012, 122 pages., (3 parts).
Oh, Chang, et al., "Development of a Supercritical Carbon Dioxide Brayton Cycle: Improving PBR Efficiency and Testing Material Compatibility", Presentation, Nuclear Energy Research Initiative Report, Oct. 2004, 38 pages.
Oh, Chang; et al., "Development of a Supercritical Carbon Dioxide Brayton Cycle: Improving VHTR Efficiency and Testing Material Compatibility", Presentation, Nuclear Energy Research Initiative Report, Final Report, Mar. 2006, 97 pages.
Parma, Ed, et al., "Supercritical CO2 Direct Cycle Gas Fast Reactor (SC-GFR) Concept" Presentation for Supercritical CO2 Power Cycle Symposium, May 24-25, 2011, Boulder, CO, 40 pages.
Parma, Ed, et al., "Supercritical CO2 Direct Cycle Gas Fast Reactor (SC-GFR) Concept", Supercritical CO2 Power Cycle Symposium, May 24-25, 2011, Boulder, CO, 9 pages.
Parma, Edward J., et al., "Supercritical CO2 Direct Cycle Gas Fast Reactor (SC-GFR) Concept", Presentation, Sandia National Laboratories, May 2011, 55 pages.
PCT/US2006/049623—Written Opinion of ISA dated Jan. 4, 2008, 4 pages.
PCT/US2007/001120—International Search Report dated Apr. 25, 2008, 7 pages.
PCT/US2007/079318—International Preliminary Report on Patentability dated Jul. 7, 2008, 5 pages.
PCT/US2010/039559—International Preliminary Report on Patentability dated Jan. 12, 2012, 7 pages.
PCT/US2010/039559—Notification of Transmittal of the International Search Report and Written Opinion of the International Searching Authority, or the Declaration dated Sep. 1, 2010, 6 pages.
PCT/US2010/044476—International Search Report dated Sep. 29, 2010, 23 pages.
PCT/US2010/044681—International Search Report and Written Opinion mailed Oct. 7, 2010, 10 pages.
PCT/US2010/044681—International Preliminary Report on Patentability dated Feb. 16, 2012, 9 pages.
PCT/US2010/049042—International Search Report and Written Opinion dated Nov. 17, 2010, 11 pages.
PCT/US2010/049042—International Preliminary Report on Patentability dated Mar. 29, 2012, 18 pages.
PCT/US2011/029486—International Preliminary Report on Patentability dated Sep. 25, 2012, 6 pages.
PCT/US2011/029486—International Search Report and Written Opinion dated Nov. 16, 2011, 9 pages.
PCT/US2011/062266—International Search Report and Written Opinion dated Jul. 9, 2012, 12 pages.
PCT/US2011/062198—International Search Report and Written Opinion dated Jul. 2, 2012, 9 pages.
PCT/US2011/062201—International Search Report and Written Opinion dated Jun. 26, 2012, 9 pages.
PCT/US2011/062204—International Search Report dated Nov. 1, 2012, 10 pages.
PCT/US2011/62207—International Search Report and Written Opinion dated Jun. 28, 2012, 7 pages.
PCT/US2012/000470—International Search Report dated Mar. 8, 2013, 10 pages.
PCT/US2012/061151—International Search Report and Written Opinion dated Feb. 25, 2013, 9 pages.
PCT/US2012/061159—International Search Report dated Mar. 2, 2013, 10 pages.
Persichilli, Michael, et al., "Supercritical CO2 Power Cycle Developments and Commercialization: Why sCO2 can Displace Steam" Echogen Power Systems LLC, Power-Gen India & Central Asia 2012, Apr. 19-21, 2012, New Delhi, India, 15 pages.
Saari, Henry, et al., "Supercritical CO2 Advanced Brayton Cycle Design", Presentation, Carleton University, Supercritical CO2 Power Cycle Symposium, May 24-25, 2011, Boulder, CO, 21 pages.
San Andres, Luis, "Start-Up Response of Fluid Film Lubricated Cryogenic Turbopumps (Preprint)", AIAA/ASME/SAE/ASEE Joint Propulsion Conference, Cincinnati, OH, Jul. 8-11, 2007, 38 pages.
Sarkar, J., and Bhattacharyya, Souvik, "Optimization of Recompression S-CO2 Power Cycle with Reheating" Energy Conversion and Management 50 (May 17, 2009), pp. 1939-1945.
Tom, Samsun Kwok Sun, "The Feasibility of Using Supercritical Carbon Dioxide as a Coolant for the Candu Reactor", The University of British Columbia, Jan. 1978, 156 pages.
VGB PowerTech Service GmbH, "CO2 Capture and Storage", A VGB Report on the State of the Art, Aug. 25, 2004, 112 pages.
Vidhi, Rachana, et al., "Study of Supercritical Carbon Dioxide Power Cycle for Power Conversion from Low Grade Heat Sources", Presentation, University of South Florida and Oak Ridge National Laboratory, Supercritical CO2 Power Cycle Symposium, May 24-25, 2011, Boulder, CO, 17 pages.
Vidhi, Rachana, et al., "Study of Supercritical Carbon Dioxide Power Cycle for Power Conversion from Low Grade Heat Sources", Paper, University of South Florida and Oak Ridge National Laboratory, Supercritical CO2 Power Cycle Symposium, May 24-25, 2011, Boulder, CO, 8 pages.
Wright, Steven A., et al., "Modeling and Experimental Results for Condensing Supercritical CO2 Power Cycles", Sandia Report, Jan. 2011, 47 pages.
Wright, Steven A., et al., "Supercritical CO2 Power Cycle Development Summary at Sandia National Laboratories", May 24-25, 2011, (1 page, Abstract only).
Wright, Steven, "Mighty Mite", Mechanical Engineering, Jan. 2012, pp. 41-43.
Yoon, Ho Joon, et al., "Preliminary Results of Optimal Pressure Ratio for Supercritical CO2 Brayton Cycle coupled with Small Modular Water Cooled Reactor", Presentation, Korea Advanced Institute of Science and Technology and Khalifa University of Science, Technology and Research, Boulder, CO, May 25, 2011, 18 pages.
Yoon, Ho Joon, et al., "Preliminary Results of Optimal Pressure Ratio for Supercritical CO2 Brayton Cycle coupled with Small Modular

(56) References Cited

OTHER PUBLICATIONS

Water Cooled Reactor", Paper, Korea Advanced Institute of Science and Technology and Khalifa University of Science, Technology and Research, May 24-25, 2011, Boulder, CO, 7 pages.
CN Search Report for Application No. 201080035382.1, 2 pages.
CN Search Report for Application No. 201080050795.7, 2 pages.
PCT/US2011/062198—Extended European Search Report dated May 6, 2014, 9 pages.
PCT/US2011/055547—Extended European Search Report dated May 28, 2014, 8 pages.
PCT/US2013/055547—Notification of Transmittal of the International Search Report and the Written Opinion of the International Searching Authority, or the Declaration dated Jan. 24, 2014, 11 pages.
PCT/US2013/064470—Notification of Transmittal of the International Search Report and the Written Opinion of the International Searching Authority, or the Declaration dated Jan. 22, 2014, 10 pages.
PCT/US2013/064471—Notification of Transmittal of the International Search Report and the Written Opinion of the International Searching Authority, or the Declaration dated Jan. 24, 2014, 10 pages.
PCT/US2014/013154—International Search Report dated May 23, 2014, 4 pages.
PCT/US2014/013170—Notification of Transmittal of the International Search Report and the Written Opinion of the International Searching Authority, or the Declaration dated May 9, 2014, 12 pages.
PCT/US2014/023026—Notification of Transmittal of the International Search Report and the Written Opinion of the International Searching Authority, or the Declaration dated Jul. 22, 2014, 11 pages.
PCT/US2014/023990—Notification of Transmittal of the International Search Report and the Written Opinion of the International Searching Authority, or the Declaration dated Jul. 17, 2014, 10 pages.
PCT/US2014/026173—Notification of Transmittal of the International Search Report and the Written Opinion of the International Searching Authority, or the Declaration dated Jul. 9, 2014, 10 pages.
Renz, Manfred, "The New Generation Kalina Cycle", Contribution to the Conference: "Electricity Generation from Enhanced Geothermal Systems", Sep. 14, 2006, Strasbourg, France, 18 pages.
Thorin, Eva, "Power Cycles with Ammonia-Water Mixtures as Working Fluid", Doctoral Thesis, Department of Chemical Engineering and Technology Energy Processes, Royal Institute of Technology, Stockholm, Sweden, 2000, 66 pages.

\* cited by examiner

US 9,014,791 B2

SYSTEM AND METHOD FOR MANAGING THERMAL ISSUES IN GAS TURBINE ENGINES

FIELD OF THE INVENTION

The present invention generally relates to a system that enables one to address various thermal management issues in advanced gas turbine engines. In one embodiment, the present invention relates to a method to extract heat from an air stream, utilize a significant fraction for on-board power generation, and reject a small quantity of heat to the fuel stream safely at, for example, a lower temperature. In another embodiment, the present invention relates to a method to extract heat from an air stream, utilize a significant fraction for on-board power generation, and reject a small quantity of heat to the fuel stream safely at, for example, a lower temperature with no potential air/fuel contact is disclosed.

BACKGROUND OF THE INVENTION

Thermal management of advanced gas turbine engines is one of the most difficult constraints on continued performance improvements. Improved thermodynamic efficiency drives the cycle designer to higher compressor pressure ratios, which necessarily result in increased compressor discharge temperatures (above, for example, 700° C.). Higher performance is also obtained by continually increasing the gas temperature entering the turbine. Because the compressor discharge air is also used to cool the high pressure turbine nozzles and blades, the combination of increased turbine inlet temperature and cooling air temperature places extreme demands on the material capability of these components.

One method for alleviating the thermal load on the turbine can be accomplished by extracting turbine cooling air from the main flowpath and reducing its temperature. Due to the unacceptable drag load of an air/air heat exchanger, the only acceptable sink for the excess heat is the fuel stream. Two major difficulties with this approach are as follows: (1) the fuel has a limited capacity to absorb heat due to thermal degradation and coking/fouling of the heat exchanger; and (2) a fuel/air heat exchanger will have high stress levels due to the large thermal differential across the two fluid streams, and will likely suffer from low cycle fatigue cracking. The fuel pressure is always higher than the air pressure, and thus any crack will permit fuel to enter the air side of the heat exchanger. At typical operating temperatures, auto-ignition of the fuel leak and a catastrophic failure of the heat exchanger and turbine are therefore highly probable.

Given the above, there is a need in the art for systems that are designed to address various thermal management issues in advanced gas turbine engines.

SUMMARY OF THE INVENTION

The present invention generally relates to a system that enables one to address various thermal management issues in advanced gas turbine engines. In one embodiment, the present invention relates to a method to extract heat from an air stream, utilize a significant fraction for on-board power generation, and reject a small quantity of heat to the fuel stream safely at, for example, a lower temperature. In another embodiment, the present invention relates to a method to extract heat from an air stream, utilize a significant fraction for on-board power generation, and reject a small quantity of heat to the fuel stream safely at, for example, a lower temperature with no potential air/fuel contact is disclosed.

In one embodiment, the present invention relates to a thermal management system for a gas turbine engine comprising: a working fluid circuit having a high pressure side and a low pressure side, and a working fluid contained in the working fluid circuit; a heat exchanger in the working fluid circuit and in thermal communication with at least one gas turbine engine, the at least one gas turbine engine acting as a heat source connected to the working fluid circuit, whereby thermal energy is transferred from the heat source to the working fluid in the working fluid circuit; an expander in the working fluid circuit and located between the high pressure side and the low pressure side of the working fluid circuit and operative to convert a pressure drop in the working fluid to mechanical energy; a recuperative heat exchanger in the working fluid circuit operative to transfer thermal energy between the high pressure side and the low pressure side of the working fluid circuit; and a pump in the working fluid circuit and connected to the low pressure side and to the high pressure side of the working fluid circuit and operative to move the working fluid through the working fluid circuit.

In another embodiment, the present invention relates to a thermal management system for a gas turbine engine comprising: a working fluid circuit having a high pressure side and a low pressure side, and a working fluid contained in the working fluid circuit; a heat exchanger in the working fluid circuit and in thermal communication with at least one gas turbine engine, the at least one gas turbine engine acting as a heat source connected to the working fluid circuit, whereby thermal energy is transferred from the heat source to the working fluid in the working fluid circuit; an expander in the working fluid circuit and located between the high pressure side and the low pressure side of the working fluid circuit and operative to convert a pressure drop in the working fluid to mechanical energy; a low pressure heat exchanger in the working fluid circuit operative to transfer thermal energy between the low pressure side and a fuel supply for the at least one gas turbine engine; a pump in the working fluid circuit and connected to the low pressure side and to the high pressure side of the working fluid circuit and operative to move the working fluid through the working fluid circuit; and a high pressure heat exchanger in the working fluid circuit operative to transfer thermal energy between the high pressure side and a lubricating system for the at least one gas turbine engine.

In still another embodiment, the present invention relates to a thermal management system for a gas turbine engine as shown and described herein.

In still another embodiment, the present invention relates to a method for accomplishing and/or addressing one or more thermal management issues in a gas turbine engine system, such method comprising the step of utilizing a system as shown and described herein to address at least one thermal management issue.

DETAILED DESCRIPTION OF THE INVENTION

The present invention generally relates to a system that enables one to address various thermal management issues in advanced gas turbine engines. In one embodiment, the present invention relates to a method to extract heat from an air stream, utilize a significant fraction for on-board power generation, and reject a small quantity of heat to the fuel stream safely at, for example, a lower temperature. In another embodiment, the present invention relates to a method to extract heat from an air stream, utilize a significant fraction for on-board power generation, and reject a small quantity of heat to the fuel stream safely at, for example, a lower temperature with no potential air/fuel contact is disclosed.

Figure 1:
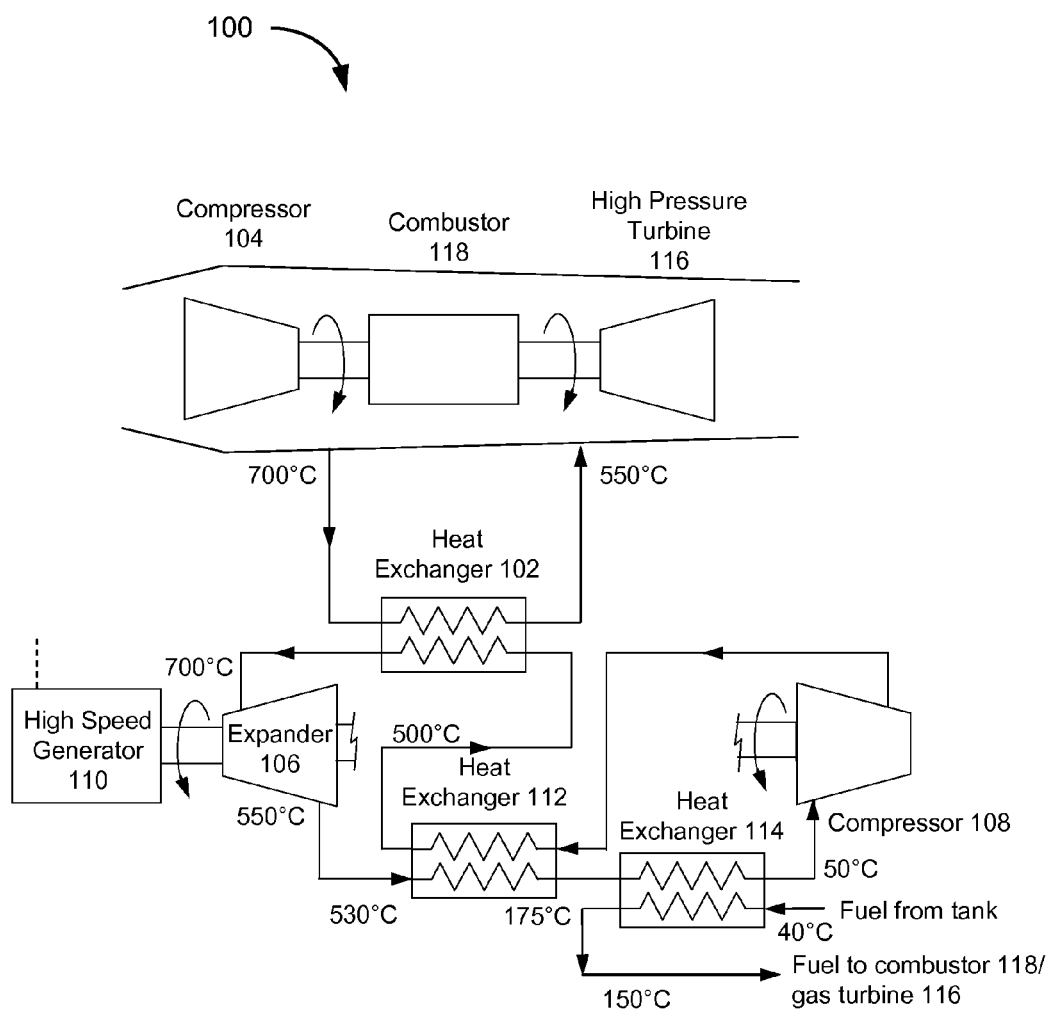
FIG. 1 is an illustration of a system in accordance with one embodiment of the present invention.

A method to extract heat from the air stream, utilizing a significant fraction for on-board power generation, and reject a smaller quantity of heat to the fuel stream safely (at lower temperature, with no potential air/fuel contact) is disclosed herein (see, e.g., FIG. 1). In FIG. 1 a closed-loop Brayton/Rankine cycle device 100 is illustrated. As is shown therein, an appropriate working fluid (e.g., supercritical $CO_2$) in combination with a heat exchanger 102 is used to extract heat from a compressor 104 having discharge air at an appropriate, or desired, temperature. It should be noted that although a given set of temperatures are disclosed in combination with the system of FIG. 1, these temperatures are exemplary in nature and the present invention is not limited thereto. The heated working fluid is expanded through an expansion device 106, which extracts shaft work to operate a compressor, pump or turbo pump 108 and an electrical generator or other work extraction device that converts shaft work to a useful form for the application, such as an air compressor, HVAC compressor or heat pump, and/or a gear box connected to a range of devices such as a low speed generator, a high speed generator, air compressor, hydraulic pump 110. The lower-temperature and pressure working fluid can optionally pass through a recuperative heat exchanger 112 to preheat the working fluid. Alternatively, the working fluid may pass through a heat exchanger to heat a second fluid where the second fluid can include water, a working fluid for a yet third thermodynamic cycle including for power generation, or an absorption or adsorption chiller. The cooler-still working fluid is then passed through a heat exchanger 114 to reject the remaining thermal energy into the fuel stream, which then proceeds through the remainder of the fuel system, and ultimately to the gas turbine 116 which is, in one embodiment, connected to combustor 118 and compressor 104. Alternatively, the remainder of the heat may be rejected to other available heat sinks, such as a water or air system. Finally, the working fluid is then recompressed by compressor 108 and passed through the high pressure side of the recuperative heat exchanger 112 thereby completing the circuit. The compressor, pump or turbo pump (or other devices) can be in electrical communication with the generator or coupled to the expander/turbine shaft. The temperatures provided are not intended to be limitations on the scope of the invention and are provided as exemplary temperatures only. In one embodiment, the expansion device 106 can be a turbine.

Regarding the working fluid after it exits expansion device 106 and until it passes through compressor 108, this is the low pressure side of the working fluid circuit. The other portion of the working fluid circuit of system 100 is considered the high pressure side. These distinctions will be further discussed in detail below.

In one instance, the working fluid of this embodiment includes, but is not limited to, a gas and/or supercritical gas or fluid. In one instance, the gas of the present invention includes, but is not limited to, ambient air, hot air, cold air, carbon dioxide, nitrogen, helium, combustion gases or waste heat exhaust. In another instance, the supercritical gas or fluid is formed from, or is, carbon dioxide, helium, nitrogen, air, argon, ammonia, etc. In yet another instance, the working fluid may contain a mixture of substances selected for their advantageous thermodynamic and physical properties.

Turning to the various components of FIG. 1, heat exchangers 102, 112 and 114 can each be independently selected from any suitable heat exchanger. Suitable heat exchangers include, but are not limited to, one or more heat exchangers that each contain therein one or more cores where each core utilizes microchannel technology.

As used herein, "microchannel technology" includes, but is not limited to, heat exchangers that contain one or more microchannels, mesochannels, and/or minichannels. As used herein the terms "microchannels," "mesochannels," and/or "minichannels" are utilized interchangeably. Additionally, the microchannels, mesochannels, and/or minichannels of the present invention are not limited to any one particular size, width and/or length. Any suitable size, width or length can be utilized depending upon a variety of factors. Furthermore, any orientation of the microchannels, mesochannels, and/or minichannels can be utilized in conjunction with the various embodiments of the present invention.

In another embodiment, a heat exchanger in accordance with the present invention can be formed with one or more cores having one or more printed circuit heat exchange (PCHE) panels. Such panels are known in the art, and are described in U.S. Pat. Nos. 6,921,518; 7,022,294; and 7,033,553, all of which are incorporated herein by reference, in their entireties, for their teachings related to printed circuit heat exchange (PCHE) panels. Other suitable heat exchangers for use as a regenerator in the system of FIG. 1 are disclosed in United States Published Patent Application No. 2006/0254759, the disclosure of which is incorporated herein in its entirety.

A non-limiting example of a suitable PCHE panel is described below. As discussed above, the present invention is not limited thereto. Rather, any suitable heat exchanger, or PCHE device, can be utilized herein.

In one embodiment, the heat exchanger panel of a desired heat exchanger is entirely of the printed circuit heat exchanger type (PCHE), and at least two differing plate designs are used to make up the panel whereby substantial variation in flow path design is achievable. Primarily, the direction of flow of fluids in the PCHE panel is initially established by the respective feed and vent connections to inlet and outlet ports of the assembled PCHE plates constituting the panel. However by altering the "printed circuit" style design of the flow path in the plates, to provide differing PCHE plates within the panel, it is possible to control both flow path direction and influence rate of heat transfer.

Use of plates of differing design is a preferred option for flexibility in design choice, but in certain cases use of plates of substantially the same design can be adopted. In the special case of identical square plates juxtaposed in a stack, each having a particular pattern of passages etched out on the surface thereof, passages in different orientations can be defined by rotating alternate plates in the plane of the plate, and optionally interposing plates having no etched surfaces (blanks) where necessary to prevent intermixing of fluids. In this fashion, a succession of flow paths in differing directions can be achieved.

It will be understood that the plates having the appropriate channels defined by etching or the like are stacked and diffusion bonded together to form heat exchanger panels, and that such panels so formed can, if necessary, be juxtaposed and joined, for example, by welding to provide a larger panel of a desired height and width to match the required heat exchanger cross-sectional area. Use of blank (un-etched plates) is appropriate in some instances to complete a panel and close the open side of channels formed in an adjacent etched plate. The reference to panels is for convenience and is not intended to indicate a dimensional limitation. However, it will be appreciated that the dimensions of the heat exchanger unit will vary according to a chosen design, and that currently available manufacturing equipment may impose some practical limitations on panel size in one step. If it is desired to form relatively large size panels, such practical limitations can be readily overcome by juxtaposition of a plurality of panels of a size formed within the capacity of the available equipment and joining thereof by a suitable method such as welding. In this way a variety of shapes and sizes of the PCHE panel can be constructed.

In one instance, the design of the plates is such that the passages defined by the printed circuit technique provide for the flow of the heat transfer media in more than one pass along the length of the plate in each direction. The flow path may be a serpentine path and optionally includes, in some embodiments, marked changes in direction to enhance turbulence in the flow of heat exchange media.

The expansion device (also referred to herein as an "expander") may be a valve or it may be a device capable of transforming high temperature and pressure fluid into mechanical energy. The expansion device may have an axial or radial construction; it may be single or multi-staged. Examples include a geroler, a gerotor, other types of positive displacement devices such as a pressure swing, a turbine, or any other device capable of transforming a pressure or pressure/enthalpy drop in a working fluid into mechanical energy.

In still another embodiment, any type of heat exchanger known to those of skill in the art can be utilized herein so long as such heat exchanger has the capacity to manage and/or meet the thermal requirements of the system in which it is incorporated. In still yet another embodiment, the present invention is not only concerned with providing a system that enables one to address various thermal management issues in advanced gas turbine engines but also to a system that is designed to address power management issues.

Regarding components 106, 108 and 110 of the system of FIG. 1, these components vary depending upon the nature of the application for the system. As such, depending upon the specifications of the system in question, or the application therefore, one of skill in the art would recognize what type and/or size turbine, compressor, and/or high-speed electrical generator to use in conjunction with the system of FIG. 1. It should also be appreciated that the nature of components 106, 108 and 110 of FIG. 1 could also dictate the type of heat exchangers and/or working fluid utilized therein.

As for the means by which the working fluid of FIG. 1 is conveyed, any suitable means is within the scope of the present invention. Such means include, but are not limited to, piping, conduit, tubes, etc. Additionally, with regard to the various numeric values disclosed in FIG. 1, these values are for illustrative purposes only and are not to be construed as limiting the scope of the present invention in any manner.

Figure 2:
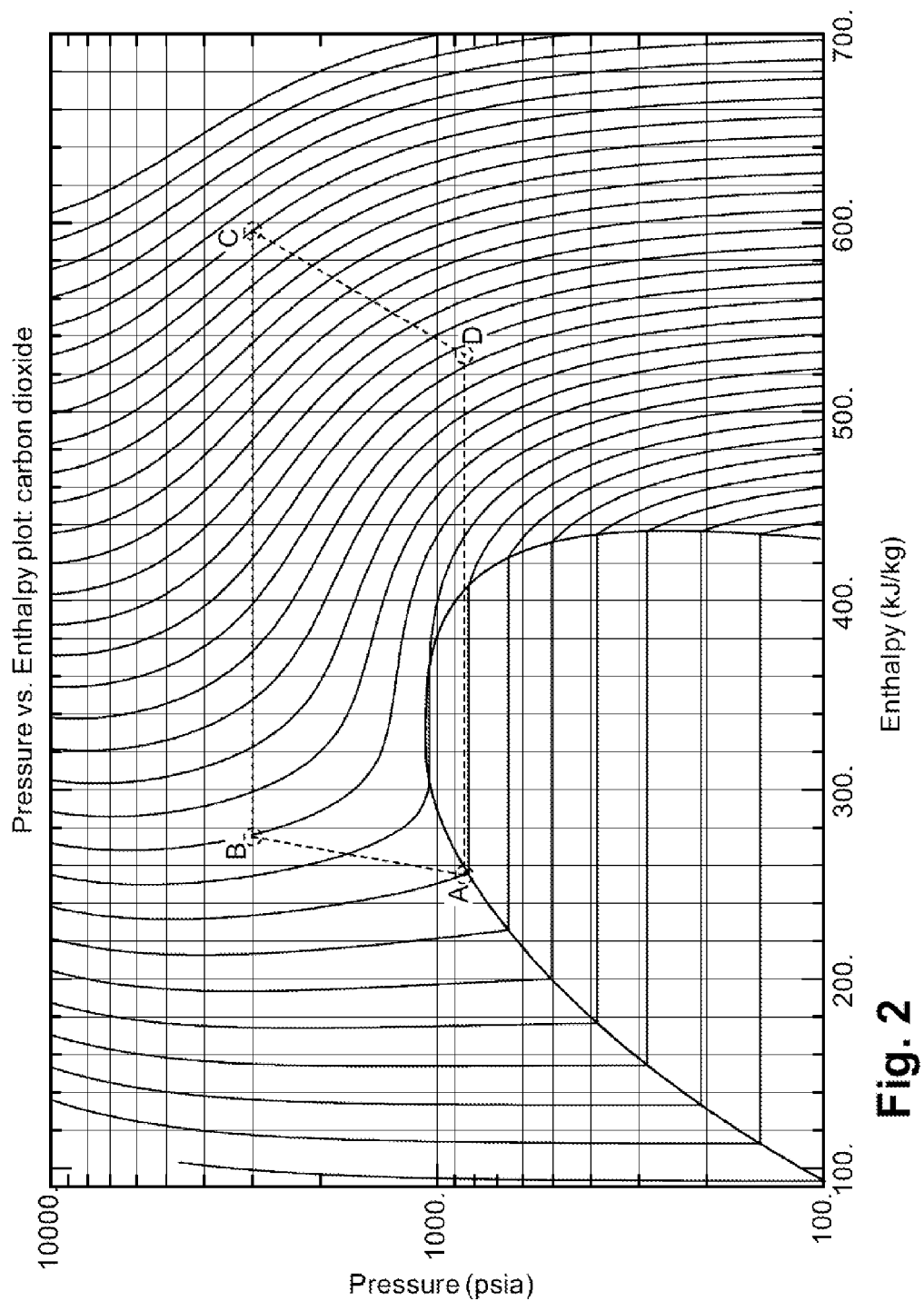
FIG. 2 is a pressure-enthalpy diagram for carbon dioxide.

In one embodiment, the thermodynamic cycle that is executed by the thermal device of the present invention is shown in its most rudimentary form in FIG. 2 which is a pressure-enthalpy diagram for carbon dioxide. The thermodynamic cycle may be described for ease of understanding by referencing a working fluid at point A on this diagram. At this point, the working fluid has its lowest pressure and lowest enthalpy relative to its state at any other point during the cycle and as shown on the diagram. From there, the working fluid is compressed and/or pumped to a higher pressure (point B on the diagram). From there, thermal energy is introduced to the working fluid which both increases the temperature of the working fluid and increases the enthalpy of the working fluid (point C on the diagram). The working fluid is then expanded through a mechanical process to point (D). From there, the working fluid discharges heat, dropping in both temperature and enthalpy, until it returns to point (A). Each process (i.e., A-B, B-C, C-D, D-A) need not occur as shown on the exemplary diagram and one of ordinary skill in the art would recognize that each step of the cycle could be achieved in a variety of ways and/or that it is possible to achieve a variety of different coordinates on the diagram. Similarly, each point on the diagram may vary dynamically over time as variables within and external to the system change, i.e., ambient temperature, waste heat temperature, amount of mass in the system.

In one embodiment of the thermal device of FIG. 1, the cycle is executed during normal, steady state operation such that the low pressure side of the system (points A and D on FIG. 2) is between 400 psia and 1500 psia and the high pressure side of the system is between 2500 psia and 4500 psia (points B and C FIG. 2). One of ordinary skill in the art would recognize that either or both higher or lower pressures could be selected for each or all points. In the one embodiment of the cycle, it will be observed that between points C and D, the working fluid transitions from a supercritical state to a subcritical state (i.e., a transcritical cycle); one of ordinary skill in the art would recognize that the pressures at points C and D could be selected such that the working fluid remained in a supercritical state during the entire cycle.

In one embodiment of the thermal engine, the working fluid is carbon dioxide. The use of the term carbon dioxide is not intended to be limited to carbon dioxide of any particular type, purity or grade of carbon dioxide although industrial grade carbon dioxide is the preferred working fluid. Carbon dioxide is a greenhouse friendly and neutral working fluid that offers benefits such as non-toxicity, non-flammability, easy availability, low price, and no need of recycling.

In one embodiment, the working fluid is in a supercritical state over certain portions of the system (the "high pressure side"), and in a subcritical state at other portions of the system (the "low pressure side"). In other embodiments, the entire cycle may be operated such that the working fluid is in a supercritical or subcritical state during the entire execution of the cycle.

In various embodiments, the working fluid can be a binary, ternary or other working fluid blend. The working fluid combination would be selected for the unique attributes possessed by the fluid combination within a heat recovery system as described herein. For example, one such fluid combination is comprised of a liquid absorbent and carbon dioxide enabling the combined fluid to be pumped in a liquid state to high pressure with less energy input than required to compress $CO_2$. In another embodiment, the working fluid may be a combination of carbon dioxide and one or more other miscible fluids. In other embodiments, the working fluid can be a combination of carbon dioxide and propane, or carbon dioxide and ammonia.

One of ordinary skill in the art would recognize that using the term "working fluid" is not intended to limit the state or phase of matter that the working fluid is in. In other words, the working fluid may be in a fluid phase, a gas phase, a supercritical phase, a subcritical state or any other phase or state at any one or more points within the cycle.

Figure 3:
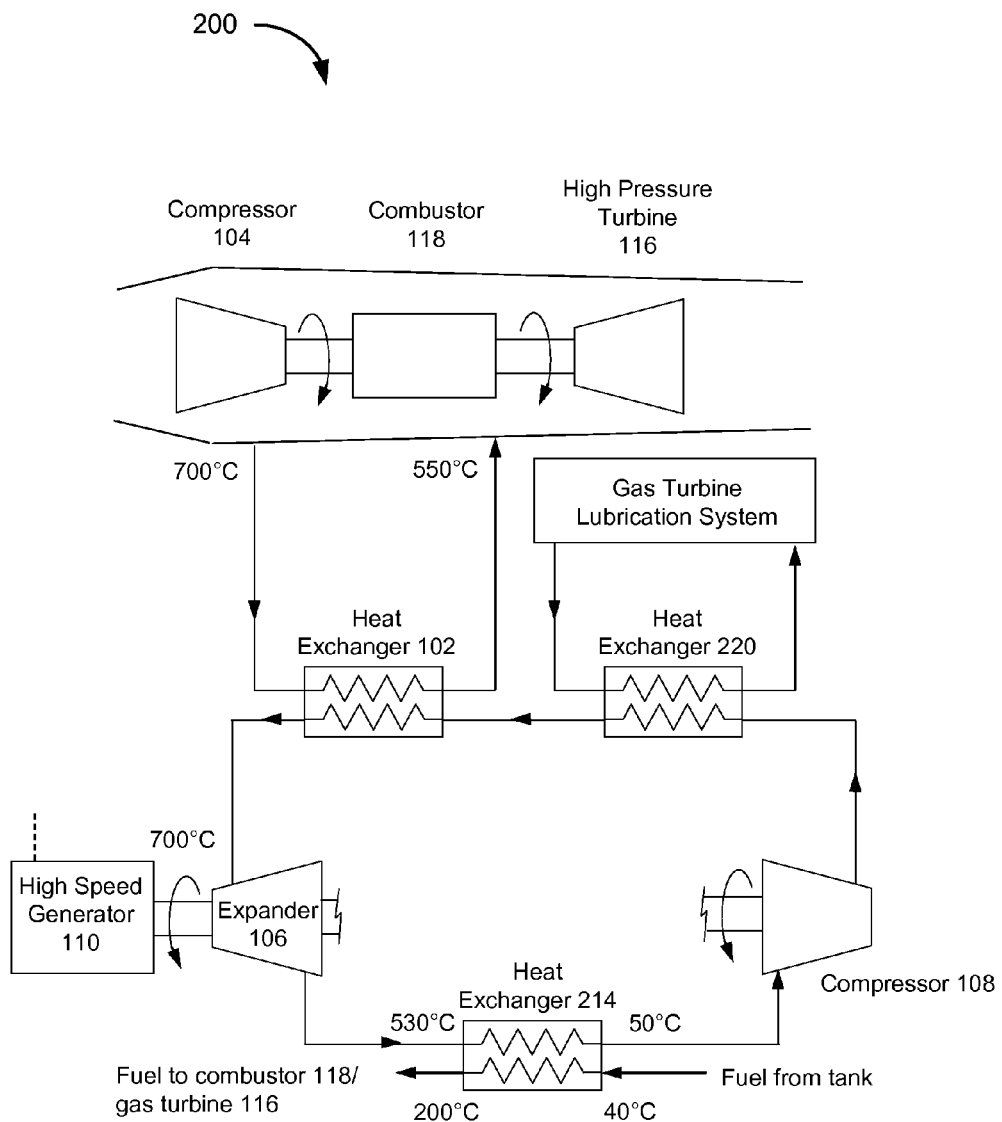
FIG. 3 is an illustration of a system in accordance with another embodiment of the present invention.

Turning to FIG. 3, FIG. 3 illustrates another system in accordance with the present invention. In the system of FIG. 3 an alternate embodiment is shown in which the recuperator of FIG. 1 is eliminated. In the system 200 of FIG. 3, the system shown therein utilizes waste heat from the gas turbine lubrication system to preheat the working fluid.

Regarding the components of the system 200 of FIG. 3, these components are similar to those of FIG. 1. As such, a detailed discussion herein is omitted for the sake of brevity. In the system of FIG. 3, heat from heat exchanger 214 receives a heated working fluid from expansion device 106 and "removes" heat from the working fluid to, in one embodiment, pre-heat fuel that is then provided ultimately to the gas turbine 116. Additionally, system 200 of FIG. 3 further comprises a heat exchanger 220 that receives a working fluid from compressor, pump or turbo pump 108 and "removes" heat from the working fluid to, in one embodiment, cool a lubricant for a gas turbine lubricant system. The working fluid is then re-supplied to heat exchanger 102 as shown in FIG. 3.

Regarding the working fluid after it exits expansion device 106 and until it passes through compressor 108, this is the low pressure side of the working fluid circuit. The other portion of the working fluid circuit of system 200 is considered the high pressure side. These distinctions are discussed in detail above.

In still another embodiment, the systems of the present invention, as represented by FIGS. 1 and 3, can be further modified by including therein any suitable elements of a fuel system from an airplane engine or other vehicle fuel system. In this embodiment, the systems of the present invention would be designed to address various thermal management issues in advanced gas turbine airplane engines. In another embodiment, the present invention further relates to a method to extract heat from an air stream, utilize a significant fraction for on-board power generation, and reject a small quantity of heat to the fuel stream safely at, for examples, a lower temperature in conjunction with one or more airplane engines and/or fuel systems.

In light of the above, in one embodiment, the present invention relates to a thermal management system for a gas turbine engine comprising: a working fluid circuit having a high pressure side and a low pressure side, and a working fluid contained in the working fluid circuit; a heat exchanger in the working fluid circuit and in thermal communication with at least one gas turbine engine, the at least one gas turbine engine acting as a heat source connected to the working fluid circuit, whereby thermal energy is transferred from the heat source to the working fluid in the working fluid circuit; an expander in the working fluid circuit and located between the high pressure side and the low pressure side of the working fluid circuit and operative to convert a pressure drop in the working fluid to mechanical energy; a recuperative heat exchanger in the working fluid circuit operative to transfer thermal energy between the high pressure side and the low pressure side of the working fluid circuit; and a pump in the working fluid circuit and connected to the low pressure side and to the high pressure side of the working fluid circuit and operative to move the working fluid through the working fluid circuit.

Given the above, in one embodiment, this thermal management system utilizes a heat exchanger that comprises one or more cores having one or more printed circuit heat exchange panels. Additionally, in one embodiment, this thermal management system utilizes a working fluid that is carbon dioxide in a supercritical state in at least a portion of the working fluid circuit. In another embodiment, this thermal management system utilizes a working fluid that is carbon dioxide in a subcritical state and a supercritical state in different portions of the working fluid circuit. In still another embodiment, this thermal management system utilizes a working fluid that is ammonia in a supercritical state in the working fluid circuit. In still yet another embodiment, this thermal management system utilizes a working fluid that is ammonia in a subcritical state and a supercritical state in the working fluid circuit.

In one embodiment, this thermal management system utilizes a recuperative heat exchanger that comprises one or more cores having one or more printed circuit heat exchange panels. In another embodiment, this thermal management system further comprising a low pressure heat exchanger operative to transfer thermal energy between the low pressure side and a fuel supply for the at least one gas turbine engine.

In another embodiment, the present invention relates to a thermal management system for a gas turbine engine comprising: a working fluid circuit having a high pressure side and a low pressure side, and a working fluid contained in the working fluid circuit; a heat exchanger in the working fluid circuit and in thermal communication with at least one gas turbine engine, the at least one gas turbine engine acting as a heat source connected to the working fluid circuit, whereby thermal energy is transferred from the heat source to the working fluid in the working fluid circuit; an expander in the working fluid circuit and located between the high pressure side and the low pressure side of the working fluid circuit and operative to convert a pressure drop in the working fluid to mechanical energy; a low pressure heat exchanger in the working fluid circuit operative to transfer thermal energy between the low pressure side and a fuel supply for the at least one gas turbine engine; a pump in the working fluid circuit and connected to the low pressure side and to the high pressure side of the working fluid circuit and operative to move the working fluid through the working fluid circuit; and a high pressure heat exchanger in the working fluid circuit operative to transfer thermal energy between the high pressure side and a lubricating system for the at least one gas turbine engine.

Given the above, in one embodiment, this thermal management system utilizes a heat exchanger that comprises one or more cores having one or more printed circuit heat exchange panels. Additionally, in one embodiment, this thermal management system utilizes a working fluid that is carbon dioxide in a supercritical state in at least a portion of the working fluid circuit. In another embodiment, this thermal management system utilizes a working fluid that is carbon dioxide in a subcritical state and a supercritical state in different portions of the working fluid circuit. In still another embodiment, this thermal management system utilizes a working fluid that is ammonia in a supercritical state in the working fluid circuit. In still yet another embodiment, this thermal management system utilizes a working fluid that is ammonia in a subcritical state and a supercritical state in the working fluid circuit.

In one embodiment, this thermal management system utilizes a low pressure heat exchanger that comprises one or more cores having one or more printed circuit heat exchange panels. In one embodiment, this thermal management system utilizes a high pressure heat exchanger that comprises one or more cores having one or more printed circuit heat exchange panels.

In one embodiment, the system of the present invention is advantageous in that it can be utilized in conjunction with any type of gas turbine (e.g., gas turbines that are utilized to generate power at, for example, a power plant) regardless of size. In another embodiment, the system of the present invention is advantageous in that the system can be adapted to be used in conjunction with gas turbine engines that are primarily designed to provide power to a vehicle (e.g., airplane). While these gas turbines might be slightly different, the system of the present invention can be applied to both. As such, all types of gas turbines and/or gas turbine engines are collectively referred to herein as "gas turbine engines." Additionally, in the instance when the system of the present invention is utilized in conjunction with one or more gas turbine engines on, for example, an airplane, the system of the present invention is advantageous in that it utilizes components that are compact, light in weight, and/or have a high energy density. Thus, a system in accordance with one embodiment of the present invention offers the flexibility of providing a thermal management system for a gas turbine in a situation where size and/or weight issues and/or concerns are present.

Although the invention has been described in detail with particular reference to certain aspects detailed herein, other aspects can achieve the same results. Variations and modifications of the present invention will be obvious to those skilled in the art, and the present invention is intended to cover in the appended claims all such modifications and equivalents.

What is claimed is:

1. A thermal management system for a gas turbine engine comprising:
    a working fluid circuit having a high pressure side and a low pressure side, and a working fluid contained in the working fluid circuit;
    a heat exchanger in the working fluid circuit and in thermal communication with at least one gas turbine engine, the at least one gas turbine engine acting as a heat source connected to the working fluid circuit, whereby thermal energy is transferred from the heat source to the working fluid in the working fluid circuit;
    an expander in the working fluid circuit and located between the high pressure side and the low pressure side of the working fluid circuit and operative to convert a pressure drop in the working fluid to mechanical energy;
    a recuperative heat exchanger in the working fluid circuit operative to transfer thermal energy between the high pressure side and the low pressure side of the working fluid circuit;
    a low pressure heat exchanger operative to transfer thermal energy between the low pressure side and a fuel supply for the at least one gas turbine engine; and
    a pump in the working fluid circuit and connected to the low pressure side and to the high pressure side of the working fluid circuit and operative to move the working fluid through the working fluid circuit.

2. The thermal management system of claim 1, wherein the heat exchanger comprises one or more cores having one or more printed circuit heat exchange panels.

3. The thermal management system of claim 1, wherein the expander comprises a turbine.

4. The thermal management system of claim 3, further comprising a power generator coupled to the expander.

5. The thermal management system of claim 4, wherein the power generator is selected from a low speed generator, a high speed generator, air compressor, or a hydraulic pump.

6. The thermal management system of claim 1, further comprising a power generator coupled to the expander.

7. The thermal management system of claim 6, wherein the power generator is selected from a low speed generator, a high speed generator, air compressor, or a hydraulic pump.

8. The thermal management system of claim 1, wherein a portion of the working fluid from the high pressure side of the working fluid circuit is used as coolant for the expander.

9. The thermal management system of claim 1, wherein the working fluid is in a supercritical state.

10. The thermal management system of claim 1, wherein the working fluid is selected from carbon dioxide, helium, nitrogen, argon or ammonia.

11. The thermal management system of claim 10, wherein the working fluid is carbon dioxide.

12. The thermal management system of claim 10, wherein the working fluid is carbon dioxide in a supercritical state in at least a portion of the working fluid circuit.

13. The thermal management system of claim 10, wherein the working fluid is carbon dioxide in a subcritical state and a supercritical state in different portions of the working fluid circuit.

14. The thermal management system of claim 10, wherein the working fluid is ammonia.

15. The thermal management system of claim 10, wherein the working fluid is ammonia in a supercritical state in the working fluid circuit.

16. The thermal management system of claim 10, wherein the working fluid is ammonia in a subcritical state and a supercritical state in the working fluid circuit.

17. The thermal management system of claim 1, wherein the recuperative heat exchanger comprises one or more cores having one or more printed circuit heat exchange panels.

18. The thermal management system of claim 1, wherein the at least one gas turbine engine is an airplane gas turbine engine.

19. A thermal management system for a gas turbine engine comprising:
    a working fluid circuit having a high pressure side and a low pressure side, and a working fluid contained in the working fluid circuit;
    a heat exchanger in the working fluid circuit and in thermal communication with at least one gas turbine engine, the at least one gas turbine engine acting as a heat source connected to the working fluid circuit, whereby thermal energy is transferred from the heat source to the working fluid in the working fluid circuit;
    an expander in the working fluid circuit and located between the high pressure side and the low pressure side of the working fluid circuit and operative to convert a pressure drop in the working fluid to mechanical energy;
    a low pressure heat exchanger in the working fluid circuit operative to transfer thermal energy between the low pressure side and a fuel supply for the at least one gas turbine engine;
    a pump in the working fluid circuit and connected to the low pressure side and to the high pressure side of the working fluid circuit and operative to move the working fluid through the working fluid circuit; and
    a high pressure heat exchanger in the working fluid circuit operative to transfer thermal energy between the high pressure side and a lubricating system for the at least one gas turbine engine.

20. The thermal management system of claim 19, wherein the heat exchanger comprises one or more cores having one or more printed circuit heat exchange panels.

21. The thermal management system of claim 19, wherein the expander comprises a turbine.

22. The thermal management system of claim 19, further comprising a power generator coupled to the expander.

23. The thermal management system of claim 22, wherein the power generator is selected from a low speed generator, a high speed generator, air compressor, or a hydraulic pump.

24. The thermal management system of claim 19, further comprising a power generator coupled to the expander.

25. The thermal management system of claim 24, wherein the power generator is selected from a low speed generator, a high speed generator, air compressor, or a hydraulic pump.

26. The thermal management system of claim 19, wherein a portion of the working fluid from the high pressure side of the working fluid circuit is used as coolant for the expander.

27. The thermal management system of claim 19, wherein the working fluid is in a supercritical state.

28. The thermal management system of claim 19, wherein the working fluid is selected from carbon dioxide, helium, nitrogen, argon or ammonia.

29. The thermal management system of claim 28, wherein the working fluid is carbon dioxide.

30. The thermal management system of claim 28, wherein the working fluid is carbon dioxide in a supercritical state in at least a portion of the working fluid circuit.

31. The thermal management system of claim 28, wherein the working fluid is carbon dioxide in a subcritical state and a supercritical state in different portions of the working fluid circuit.

32. The thermal management system of claim 28, wherein the working fluid is ammonia.

33. The thermal management system of claim 28, wherein the working fluid is ammonia in a supercritical state in the working fluid circuit.

34. The thermal management system of claim 28, wherein the working fluid is ammonia in a subcritical state and a supercritical state in the working fluid circuit.

35. The thermal management system of claim 19, wherein the low pressure heat exchanger comprises one or more cores having one or more printed circuit heat exchange panels.

36. The thermal management system of claim 19, wherein the high pressure heat exchanger comprises one or more cores having one or more printed circuit heat exchange panels.

37. The thermal management system of claim 19, wherein the at least one gas turbine engine is an airplane gas turbine engine.

\* \* \* \* \*